Aug. 31, 1965    P. LEFFERTS    3,203,306
OPTICAL RAY CONCENTRATOR
Filed Sept. 25, 1961

INVENTOR
PETER LEFFERTS
BY *Arthur Jacob*
ATTORNEY

United States Patent Office 3,203,306
Patented Aug. 31, 1965

3,203,306
OPTICAL RAY CONCENTRATOR
Peter Lefferts, Princeton, N.J.
Filed Sept. 25, 1961, Ser. No. 140,361
2 Claims. (Cl. 88—1)

The present invention relates to an optical device for collecting optical rays within or near the visible spectrum to more effectively concentrate such rays for practical applications. More specifically, the invention is concerned with devices for focusing substantially parallel optical rays from a given source into a concentrated line or point image. Such a device may be employed, for example, as a solar energy concentrator and provide heat generating means in various types of apparatus utilized for heating, cooking, boiling, thawing and drying applications. Further, such a device may be employed as a collector for rays within or near the visible spectrum including infrared rays to concentrate such rays in communications or signalling applications.

An important object of the invention is to provide a device for collecting and concentrating optical rays.

Another object of the invention is to provide a simple heat generating device utilizing solar energy.

A further object is to provide a solar energy optical device which can be made of inexpensive materials and which can be made in very large sizes without the need for expensive manufacturing techniques.

A further object is to provide an optical device that is made of a material which is flexible to a point where it may be easily rolled or folded for ease in storage or portability. This feature makes the device particularly well suited to portable applications.

A still further object is to provide an optical ray concentrator that can be made in large sizes heretofore unattainable practically to collect a greater amount of optical rays and to find large area uses.

A still further object is to provide an optical ray concentrator made of a light-weight material to allow the use of light-weight support structures and related equipment as well as facilitate portability.

The invention may be described briefly as a device for concentrating optical rays by refraction and comprises a foldable, transparent sheet of plastic material and a series of dioptric elements in at least one surface of the sheet, the dioptric elements forming a pattern capable of focusing generally parallel optical rays into a concentrated image when the sheet is maintained in an unfolded configuration. In addition, the invention contemplates means along the perimeter of the sheet for maintaining the sheet taut in the unfolded configuration.

The invention will be more fully understood and additional objects and advantages thereof will become apparent in the following detailed description of specific embodiments of the invention illustrated in the drawings in which.

The invention consists of a transparent sheet of plastic material with a dioptric pattern formed in either one or both surfaces of the sheet. The plastic material is of an extremely flexible and supple variety so as to allow the sheet to be folded or rolled into a compact package without damaging the material or the dioptric pattern. Such plastics as polyvinyls, polycarbonates, polypropylenes and transparent, heat resistant polyethylenes have been found suitable. The thickness of the sheet is determined largely by the total area of the sheet and the configuration of the dioptric or lens pattern formed in the surface and is kept to a minimum to retain maximum flexibility of the entire sheet. In order to maintain a minimum thickness the lens pattern is made up of a series of ridges which constitute prism-like dioptric elements in the surface of the material. These ridges form a step-type or "Fresnel" lens.

When the sheet is used as a collecting and concentrating device for optical rays it must be supported in a relatively unfolded state. To this end, means are provided to hold the sheet taut in the desired surface configuration. Because of the light weight of the sheet relative to conventional concentrator materials, these means may be relatively light in weight.

Whenever the term "optical rays" is used throughout the specification and the appended claims, the term will be understood to include all rays within or near the visible spectrum including infrared rays. This terminology is chosen in preference to much broader terms such as "radiant energy" or "radiation since it more closely describes the area in which the invention finds maximum utility. The term "foldable" is used in the specification and claims to describe the extreme flexibility of the sheet material as described above, the material being of a limply flexible or foldable variety.

Figure 1:
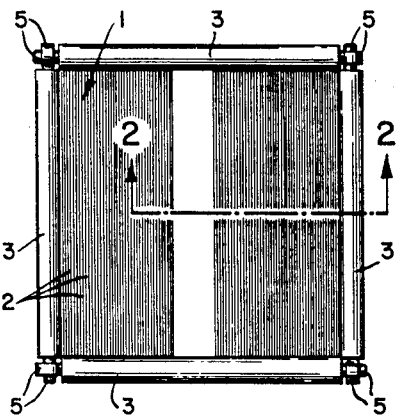
FIGURE 1 is a plan view of a concentrator employing a rigid support frame.
Figure 2:
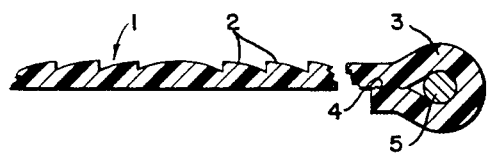
FIGURE 2 is an enlarged sectional view taken along line 2—2 of FIGURE 1.
Figure 3:
FIGURE 3 is an enlarged sectional view of an alternative configuration of FIGURE 2.

Referring now to the embodiment of FIGURE 1, the sheet is indicated generally at 1. In the particular configuration illustrated, the ridges 2 are parallel to one another so that the lens pattern formed in the surface of the sheet 1 is a step-type cylindrical lens for focusing parallel optical rays from a given source into a concentrated line image. The enlarged cross-section of FIGURE 2 shows the semi-lenticular shape of ridges 2. The series of ridges 2 comprises a steptype cylindrical lenticular shaped lens. FIGURE 3 illustrates a sheet wherein a cylindrical lenticular lens pattern has been formed in both surfaces of the sheet. It is apparent that the ridges may be so arranged as to focus parallel optical rays from a given source into one or more concentrated line images, as desired.

When employed as a solar energy concentrator, the cylindrical lens configuration has an advantage of requiring very little change in orientation throughout the shifting positions of the sun during the day. Where the concentrator is positioned so that the line image is parallel to the path of travel of the sun, movement of the sun will move the line image only a small percentage of its length.

Figure 4:
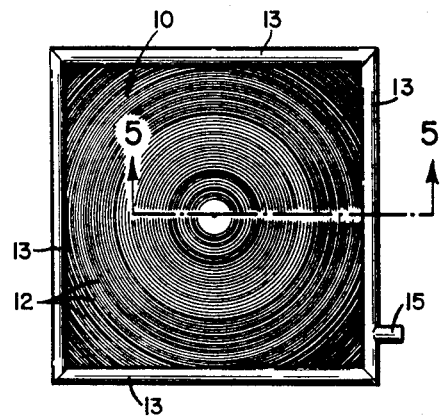
FIGURE 4 is a plan view of a concentrator employing an inflatable support frame.
Figure 5:
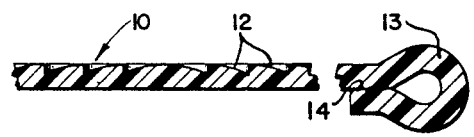
FIGURE 5 is an enlarged sectional view taken along line 5—5 of FIGURE 4.
Figure 6:
FIGURE 6 is an enlarged sectional view of an alternative configuration of FIGURE 5.

Referring now to the embodiment of FIGURE 4, the sheet is indicated generally at 10. In this configuration, the ridges 12 are concentric to one another so that the lens pattern formed in the surface of the sheet is a step-type spherical lens for focusing parallel optical rays from a given source at a concentrated point image. The enlarged cross-section of FIGURE 5 shows the semi-lenticular shape of the ridges 12. The series of ridges 12 comprises a step-type spherical lenticular lens. FIGURE 6 illustrates a sheet wherein a spherical lens pattern has been formed in both surfaces of the sheet. It is apparent that the ridges may be arranged so as to focus the parallel optical rays at one or more points as desired.

To maintain the sheet taut in an unfolded configuration during use as a concentrator, means are provided along the edges of the sheet.

In the embodiment of FIGURE 1 the edges of the sheet are formed into loops 3. The loops are integral with the perimeter of the sheet and are closed at the seams 4 by welding or other suitable joining means. The loops 3 provide support means which may receive rigid frame members 5. The rigid frame members cooperate with one another to form an expansible frame which will place the required tension in the sheet and maintain said sheet taut in an unfolded state. The frame may be made expansible by means of the frame members having an adjustable length, or by enabling each member to be adjusted relative to the other, or by any other suitable means.

In the embodiment of FIGURE 4 the edges of the sheet are formed into a collapsible, air-tight, tubular support 13. The tubular support is integral with the perimeter of the sheet and is closed at seam 14 by welding or any suitable air-tight means. Air is introduced under pressure through valve 15 to expand the tubular support thus inflating the tubular support and forming a rigid surrounding frame for maintaining the sheet taut in an unfolded state.

While the embodiments illustrated are relatively flat concentrators, it will be apparent that the plastic sheet may be made to follow a variety of curvatures depending upon the demands of the apparatus in which it is to be employed. For example, in portable water distilling devices, it may be advantageous to stretch the sheet over semi-circular frame members to form a cylindrical surface. Alternately, a separate rigid frame need not be employed in a water distilling device where the device is inflated and the concentrator froms an outer curved surface completing the inflated envelope of said device. In such a device, internal air pressure will be sufficient to maintain the concentrator taut in an operable configuration. The geometry of the ridges would be adjusted accordingly. That is, a given shape and arrangement of the ridges will be determined by the configuration of the sheet when it is in use.

Many applications of the concentrator of the invention in both small area and large area configurations are visualized. Large area applications employing solar energy may include solar heating of dwellings, swimming pools and the like, snow melting, drying or dehydrating of crops directly in the fields and thermoelectric power sources. Small area uses employing solar energy may include novelty picnic equipment for cooking picnic meals, cooking devices for survival equipment, solar stills for drinking water, heat sterilizers for first aid kits and portable hospitals and tent warmers for arctic and mountain explorers.

Concentrators of the invention may be employed in both large and small varieties to collect and concentrate rays within or near the visible spectrum which rays are used in communications and signalling. For example, in communications apparatus employing modulated infrared beams as transmission media, a concentrator of the invention may be employed to collect said infrared beams over a large area thereby increasing the sensitivity of the overall communications device. Large area concentrators may also be utilized in detecting devices for collecting and concentrating infrared radiation emitted from those objects to be detected.

It will be readily apparent that most of the above applications take advantage of the light weight and portable nature of the concentrator. Since the concentrator may readily be folded or rolled up into a small package it may be employed in areas where conventional optical devices could not heretofore be practically utilized.

The concentrators of the invention lend themselves to simple manufacturing processes. While both the spherical lens and the cylindrical lens varieties may be formed in large area sheets by moldinfi embossing, cutting or grinding, the cylindrical lens configuration has the added advantage of being adaptable to continuous forming operations such as rolling, drawing or extruding. The combination of inexpensive materials and simple manufacturing processes allows large area concentrators to be produced in a practical manner.

Although the invention has been described by way of example in connection with a limited number of embodiments, it is readily apparent that it may be applied to a wide variety of configurations and therefore it is intended in the appended claims to cover all modifications and variations coming within the true spirit and scope of the invention.

I claim:
1. A device for concentrating optical rays by refraction, said device comprising:
   (A) a foldable, transparent sheet of plastic material;
   (B) a series of dioptric elements in at least one surface of said sheet, said dioptric elements forming a pattern capable of focusing generally optical rays into a concentrated image when said sheet is maintained in an unfolded configuration; and
   (C) means along the perimeter of said sheet for maintaining said sheet taut in said unfolded configuration, said means including
      (1) support means comprised of said plastic material and established integral with said sheet along at least a portion of the perimeter thereof; and
      (2) rigid frame means engaging said support means for holding said sheet taut in said unfolded configuration.

2. A device for concentrating optical rays by refraction, said device comprising:
   (A) a foldable, transparent sheet of plastic material;
   (B) a series of dioptric elements in at least one surface of said sheet, said dioptric elements forming a pattern capable of focusing generally optical rays into a concentrated image when said sheet is maintained in an unfolded configuration; and
   (C) means along the perimeter of said sheet for maintaining said sheet taut in said unfolded configuration, said means including collapsible, air-tight, inflatable tubular means integral with the perimeter of said sheet for holding said sheet taut in said unfolded configuration when said tubular means is inflated.

References Cited by the Examiner

UNITED STATES PATENTS

| | | | |
|---|---|---|---|
| 2,404,448 | 7/46 | Martin. | |
| 2,510,344 | 6/50 | Law | 88—28.93 |
| 2,529,701 | 11/50 | Maloff | 88—28.93 |
| 2,726,573 | 12/55 | Maloff | 88—57 |
| 2,798,478 | 7/57 | Tarcici. | |
| 2,875,543 | 3/59 | Sylvester et al. | 88—1 X |

OTHER REFERENCES

Eastman Kodak, Plastic Field Lens, Rev. Sci. Instr., vol. 20, June 1949, page 466.

JEWELL H. PEDERSEN, *Primary Examiner.*